United States Patent
Sugiyama et al.

(10) Patent No.: US 9,850,867 B2
(45) Date of Patent: Dec. 26, 2017

(54) CONTROL SYSTEM FOR INTERNAL COMBUSTION ENGINE AND INERT GAS CONCENTRATION DETECTING DEVICE FOR COMPRESSED NATURAL GAS

(71) Applicants: Kouseki Sugiyama, Shizuoka-ken (JP); Satoshi Taniguchi, Numazu (JP); Masahiko Masubuchi, Mishima (JP); Hiroshi Eto, Obu (JP)

(72) Inventors: Kouseki Sugiyama, Shizuoka-ken (JP); Satoshi Taniguchi, Numazu (JP); Masahiko Masubuchi, Mishima (JP); Hiroshi Eto, Obu (JP)

(73) Assignees: TOYOTA JIDOSHA KABUSHIKI KAISHA, Toyota-shi (JP); AISAN KOGYO KABUSHIKI KAISHA, Obu-shi (JP)

( * ) Notice: Subject to any disclaimer, the term of this patent is extended or adjusted under 35 U.S.C. 154(b) by 166 days.

(21) Appl. No.: 14/367,620

(22) PCT Filed: Dec. 19, 2012

(86) PCT No.: PCT/IB2012/002755
§ 371 (c)(1),
(2) Date: Jun. 20, 2014

(87) PCT Pub. No.: WO2013/093598
PCT Pub. Date: Jun. 27, 2013

(65) Prior Publication Data
US 2014/0360471 A1 Dec. 11, 2014

(30) Foreign Application Priority Data

Dec. 21, 2011 (JP) .................................. 2011-280320
Mar. 22, 2012 (JP) .................................. 2012-064981

(51) Int. Cl.
*F02D 19/00* (2006.01)
*F02M 47/02* (2006.01)
(Continued)

(52) U.S. Cl.
CPC ........... *F02M 47/02* (2013.01); *F02D 19/029* (2013.01); *F02D 41/0027* (2013.01);
(Continued)

(58) Field of Classification Search
CPC ........ Y02T 10/32; F02B 43/00; F02D 19/022; F02D 19/024; F02D 19/027;
(Continued)

(56) References Cited

U.S. PATENT DOCUMENTS 5,367,999 A * 11/1994 King .................. F02B 43/00
123/458
5,522,369 A * 6/1996 Povinger .............. F02B 43/00
123/447

(Continued)

FOREIGN PATENT DOCUMENTS

JP 2004-346842 A 12/2004
JP 2004-346904 A 12/2004
JP 2004-346911 A 12/2004

*Primary Examiner* — Hai Huynh
*Assistant Examiner* — Gonzalo Laguarda
(74) *Attorney, Agent, or Firm* — Sughrue Mion, PLLC

(57) ABSTRACT

In a control system that includes a pressure accumulating portion that supplies CNG to a fuel injection valve and a regulator that adjusts a pressure in the pressure accumulating portion to a set pressure and of which a valve element opens when CNG is supplied to the pressure accumulating portion and closes when supply of CNG to the pressure accumulating portion is shut off, a control parameter relating to a combustion state in an internal combustion engine is controlled on the basis of a length of a period during which an opening degree of the valve element reduces from a first predetermined opening degree to a second predetermined (Continued)

opening degree when the pressure in the pressure accumulating portion is adjusted to the set pressure by the regulator.

9 Claims, 14 Drawing Sheets

(51) Int. Cl.
*F02D 41/06* (2006.01)
*F02D 41/40* (2006.01)
*F02D 41/00* (2006.01)
*F02M 21/02* (2006.01)
*F02D 19/06* (2006.01)
*F02D 19/02* (2006.01)
*F02D 41/38* (2006.01)
*F02P 5/15* (2006.01)
*F02D 13/02* (2006.01)

(52) U.S. Cl.
CPC ........... *F02D 41/062* (2013.01); *F02D 41/40* (2013.01); *F02M 21/0239* (2013.01); *F02D 13/02* (2013.01); *F02D 19/022* (2013.01); *F02D 19/0647* (2013.01); *F02D 41/0047* (2013.01); *F02D 41/3845* (2013.01); *F02D 2041/001* (2013.01); *F02D 2200/0602* (2013.01); *F02D 2200/0612* (2013.01); *F02P 5/1502* (2013.01); *Y02T 10/32* (2013.01); *Y02T 10/44* (2013.01)

(58) Field of Classification Search
CPC .. F02D 19/029; F02D 41/0027; F02D 41/062; F02D 41/40; F02M 47/02; F02M 21/0239
USPC ........ 123/525, 457, 510, 511, 472, 478, 490
See application file for complete search history.

(56) References Cited

U.S. PATENT DOCUMENTS

| | | | | |
|---|---|---|---|---|
| 5,755,254 | A | * | 5/1998 | Carter ................ G05D 16/0602 137/340 |
| 5,941,210 | A | * | 8/1999 | Hill ......................... F02B 43/00 123/298 |
| 6,145,494 | A | * | 11/2000 | Klopp ................. F02D 19/0631 123/406.32 |
| 2013/0238217 | A1 | * | 9/2013 | Nolan ................. F02D 41/3845 701/102 |
| 2014/0076283 | A1 | * | 3/2014 | Pursifull ............ F02M 21/0239 123/458 |
| 2014/0081565 | A1 | * | 3/2014 | Pursifull ............... F02D 19/022 701/113 |

* cited by examiner

CONTROL SYSTEM FOR INTERNAL COMBUSTION ENGINE AND INERT GAS CONCENTRATION DETECTING DEVICE FOR COMPRESSED NATURAL GAS

BACKGROUND OF THE INVENTION

1. Field of the Invention

The invention relates to a control system for an internal combustion engine that uses compressed natural gas (CNG) as fuel and an inert gas concentration detecting device for CNG.

2. Description of Related Art

Japanese Patent Application Publication No. 2004-346911 (JP 2004-346911 A) describes a technique for correcting a fuel injection amount on the basis of a fuel property in an internal combustion engine that uses CNG as fuel. In JP 2004-346911 A, a fuel property is identified on the basis of a measured value of an in-cylinder pressure sensor that measures a pressure in a cylinder. A fuel injection amount is corrected on the basis of the identified fuel property.

Japanese Patent Application Publication No. 2004-346842 (JP 2004-346842 A) describes a technique relating to start control in a bifuel engine that is able to independently supply gasoline and CNG as fuel.

The properties of CNG that is used as fuel in the internal combustion engine are not always uniform. That is, the amount of inert gas (for example, carbon dioxide ($CO_2$) and nitrogen ($N_2$)) contained in CNG may significantly vary depending on, for example, a CNG refueling station. As the inert gas concentration of CNG that is used as fuel in the internal combustion engine varies, the combustion state of the CNG may be instable or the exhaust characteristic may deteriorate.

SUMMARY OF THE INVENTION

The invention provides a technique that contributes to proper operation of an internal combustion engine that uses CNG as fuel even when the inert gas concentration of CNG varies in the internal combustion engine.

A first aspect of the invention provides a control system for an internal combustion engine that uses compressed natural gas as fuel. The control system includes: a pressure accumulating portion that stores compressed natural gas, which is injected from a fuel injection valve of the internal combustion engine, in a state where the compressed natural gas is kept at a set pressure, and that supplies compressed natural gas to the fuel injection valve; a regulator including a valve element that opens when the compressed natural gas is supplied to the pressure accumulating portion and closes when supply of the compressed natural gas to the pressure accumulating portion is shut off, so that the regulator adjusts a pressure in the pressure accumulating portion to the set pressure; and a control unit that, when the pressure in the pressure accumulating portion is being adjusted to the set pressure by the regulator, controls a control parameter relating to a combustion state in the internal combustion engine on the basis of either a period during which an opening degree of the valve element reduces from a first predetermined opening degree to a second predetermined opening degree or a parameter that correlates with the period.

With this configuration, it is possible to control the control parameter relating to a combustion state in the internal combustion engine to a value corresponding to a concentration of the inert gas that is contained in CNG and that is actually subjected to combustion in the internal combustion engine. Therefore, even when the concentration of the inert gas contained in CNG has changed due to, for example, refueling of new CNG, it is possible to properly operate the internal combustion engine.

In the control system according to the first aspect of the invention, the regulator may be arranged in a fuel supply passage that leads compressed natural gas to the pressure accumulating portion.

In the control system according to the first aspect of the invention, the control unit may control the control parameter relating to a combustion state in the internal combustion engine on the basis of, besides the period during which the opening degree of the valve element of the regulator reduces from the first predetermined opening degree to the second predetermined opening degree or the parameter that correlates with the period, either a pressure of CNG on an upstream side of the regulator or a parameter that correlates with the pressure of the CNG on the upstream side of the regulator. With this configuration, it is possible to properly, operate the internal combustion engine.

A second aspect of the invention provides an inert gas concentration detecting device that detects an inert gas concentration of compressed natural gas in an internal combustion engine that uses compressed natural gas as fuel. The inert gas concentration detecting device includes: a pressure accumulating portion that stores compressed natural gas, which is injected from a fuel injection valve of the internal combustion engine, in a state where the compressed natural gas is kept at a set pressure, and that supplies compressed natural gas to the fuel injection valve; a regulator including a valve element that opens when the compressed natural gas is supplied to the pressure accumulating portion and closes when supply of the compressed natural gas to the pressure accumulating portion is shut off, so that the regulator adjusts a pressure in the pressure accumulating portion to the set pressure; and an estimating unit that, when the pressure in the pressure accumulating portion is adjusted to the set pressure by the regulator, estimates a concentration of the inert gas contained in compressed natural gas on the basis of either a period during which an opening degree of the valve element reduces from a first predetermined opening degree to a second predetermined opening degree or a parameter that correlates with the period. With this configuration, even when the concentration of the inert gas contained in CNG has changed due to, for example, refueling of new CNG, it is possible to detect the concentration of the inert gas that is contained in CNG and that is actually subjected to combustion in the internal combustion engine. In addition, at the time of a start of the internal combustion engine, it is possible to detect the concentration of the inert gas contained in CNG at the time point before air-fuel mixture is burned (at the time point before CNG is injected from the fuel injection valve).

In the inert gas concentration detecting device according to the second aspect of the invention, the regulator may be arranged in a fuel supply passage that leads compressed natural gas to the pressure accumulating portion.

In the inert gas concentration detecting device according to the second aspect of the invention, the estimating unit may estimate the concentration of the inert gas contained in CNG on the basis of, besides the period during which the opening degree of the valve element of the regulator reduces from the first predetermined opening degree to the second predetermined opening degree or the parameter that correlates with the period, either a pressure of CNG on an upstream side of the regulator or a parameter that correlates with the pressure of the CNG on the upstream side of the regulator. With this configuration, it is possible to further highly accurately estimate the concentration of the inert gas contained in CNG.

A third aspect of the invention provides a control system for an internal combustion engine. The control system includes a control unit that controls a control parameter relating to a combustion state in the internal combustion engine on the basis of a concentration of an inert gas contained in compressed natural gas, the concentration of the inert gas being estimated by the estimating unit of the inert gas concentration detecting device according to the second aspect of the invention.

According to the invention, as in the case of the first aspect of the invention, it is possible to control the control parameter relating to a combustion state in the internal combustion engine to a value corresponding to the concentration of the inert gas contained in CNG that is actually subjected to combustion in the internal combustion engine. Therefore, even when the concentration of the insert gas contained in CNG has changed due to, for example, refueling of new CNG, it is possible to properly operate the internal combustion engine.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings. The sizes, materials, shapes, relative arrangement, and the like, of components described in the present embodiments are not intended to limit the technical scope of the invention unless otherwise specified.

Figure 1:
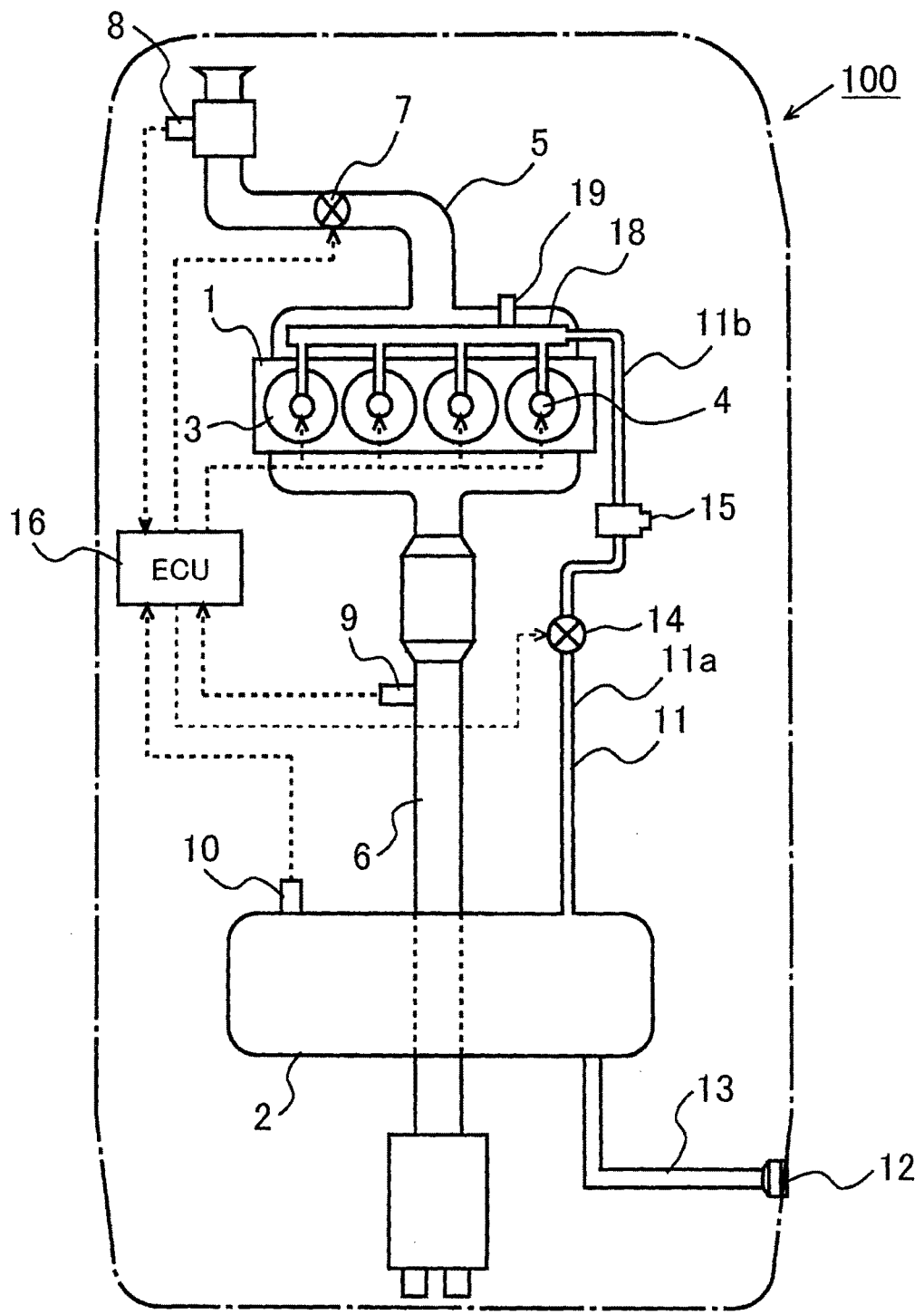
FIG. 1 is a view that shows the schematic configuration of a vehicle on which an internal combustion engine that uses CNG as fuel is mounted according to a first embodiment.

An example in which the invention is applied to an internal combustion engine for propelling a vehicle will be described. FIG. 1 is a view that shows the schematic configuration of a vehicle on which an internal combustion engine that uses CNG as fuel is mounted according to the present embodiment.

As shown in FIG. 1, the internal combustion engine 1 and a fuel tank 2 are mounted on the vehicle 100. The internal combustion engine 1 includes a plurality of cylinders 3 and fuel injection valves 4 that respectively inject fuel into the corresponding cylinders 3. An intake passage 5 and an exhaust passage 6 are connected to the internal combustion engine 1.

The intake passage 5 is a passage that is used to lead fresh air (air) taken in from the atmosphere to the cylinders 3 of the internal combustion engine 1. An intake throttle valve 7 and an intake air temperature sensor 8 are installed in the intake passage 5. The intake throttle valve 7 is used to change the passage cross-sectional area of the intake passage 5. The intake air temperature sensor 8 measures the temperature of fresh air (air) (outside air temperature).

The exhaust passage 6 is a passage that is used to emit burned gas (exhaust gas), exhausted from the cylinders 3, to the atmosphere after passing through an exhaust gas purification catalyst, a muffler, and the like. An A/F sensor 9 is installed in the exhaust passage 6. The A/F sensor 9 outputs an electrical signal that correlates with an air-fuel ratio.

The fuel tank 2 is a tank that stores compressed natural gas (CNG). A first pressure sensor 10 is installed at the fuel tank 2. The first pressure sensor 10 is used to measure the pressure in the fuel tank 2. In addition, the fuel tank 2 communicates with a delivery pipe 18 via a fuel supply tube 11. The fuel supply tube 11 is a passage that is used to lead CNG in the fuel tank 2 to the delivery pipe 18. The delivery pipe 18 communicates with the fuel injection valves 4. The delivery pipe 18 stores CNG, which is injected from the fuel injection valves 4, in a state where the CNG is kept at a set pressure, and supplies CNG to the fuel injection valves 4. A second pressure sensor 19 is installed in the delivery pipe 18. The second pressure sensor 19 is used to measure the pressure in the delivery pipe 18.

The fuel tank 2 is connected to a fill opening 12 via an inlet pipe 13. The fill opening 12 is provided at a vehicle body of the vehicle 100. The fill opening 12 opens when a fuel service nozzle arranged at a gas station, or the like, is inserted. The fill opening 12 introduces CNG, which is supplied from the fuel service nozzle, into the inlet pipe 13.

A shutoff valve 14 and a regulator 15 are arranged in the fuel supply tube 11. The shutoff valve 14 is a valve device that is closed during a stop of operation of the internal combustion engine 1 and that is opened during operation of the internal combustion engine 1. The shutoff valve 14 may be, for example, an electromagnetic valve device that opens when driving electric power is applied and that closes when no driving electric power is applied. The regulator 15 is a mechanical valve device that adjusts the pressure in the delivery pipe 18 to a set pressure by reducing the pressure of CNG that is supplied from the fuel tank 2.

Figure 2:
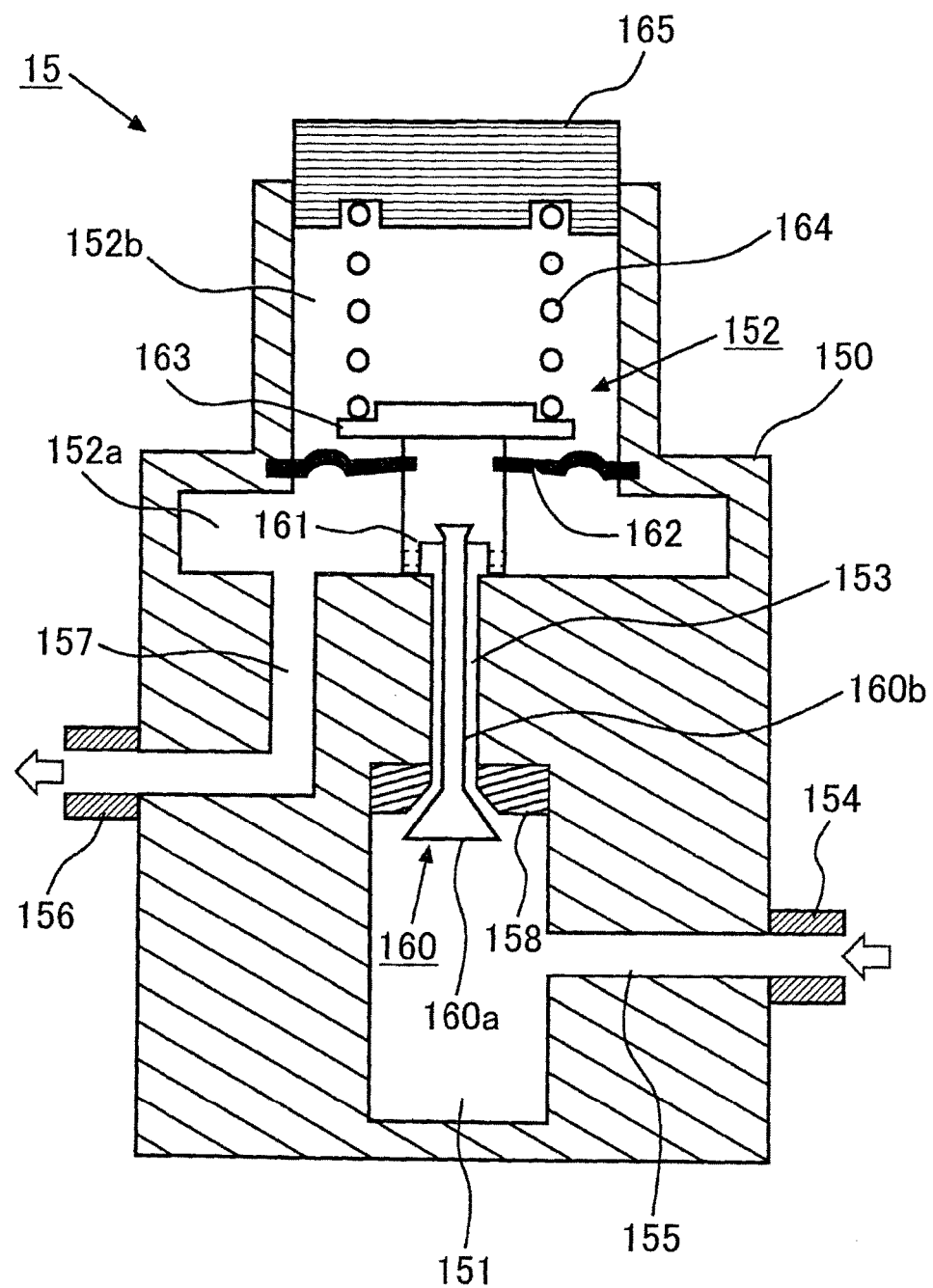
FIG. 2 is a first view that shows the schematic configuration of a regulator according to the first embodiment.
Figure 3:
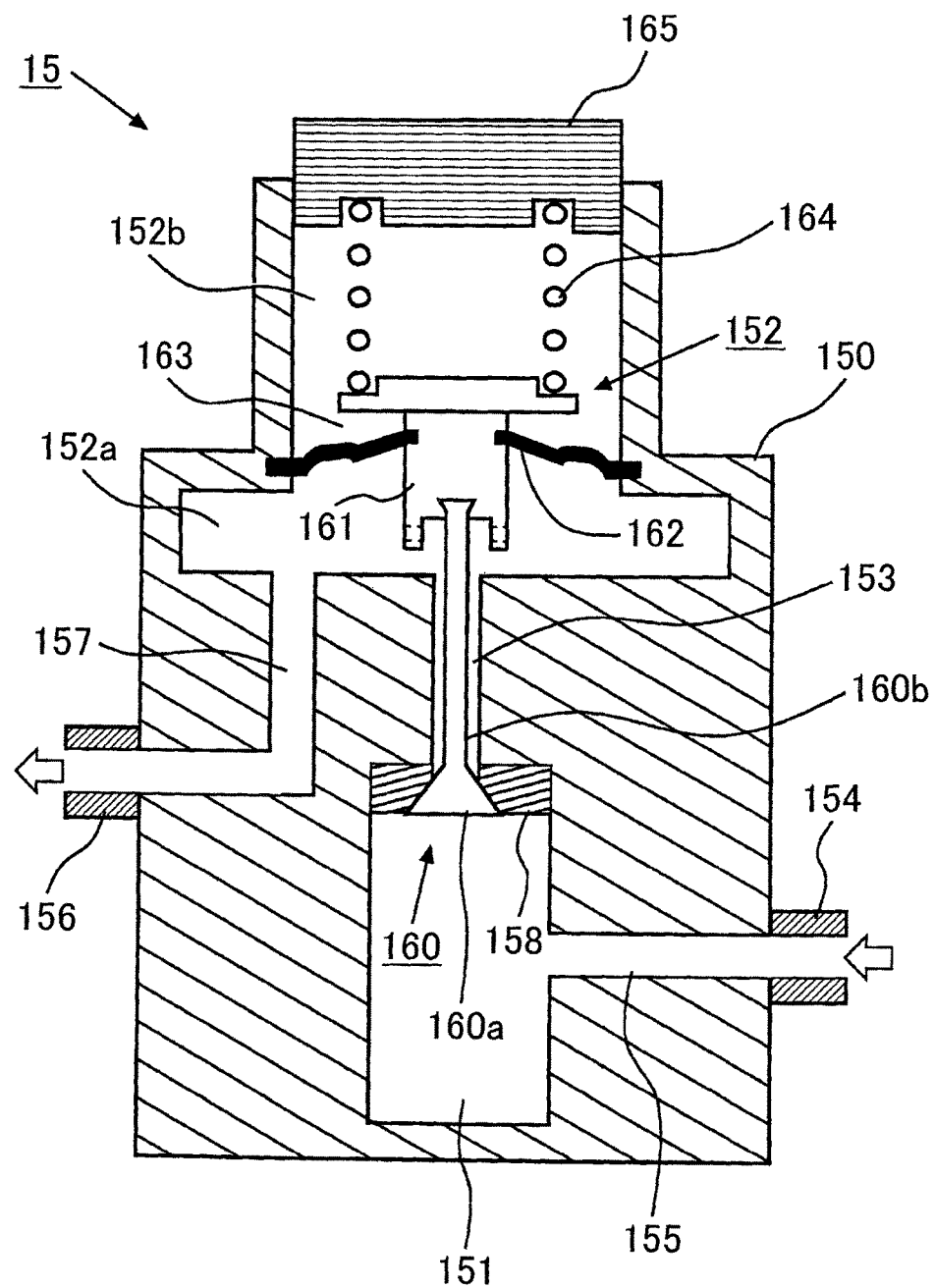
FIG. 3 is a second view that shows the schematic configuration of the regulator according to the first embodiment.

Here, the schematic configuration of the regulator 15 will be described with reference to FIG. 2 and FIG. 3. FIG. 2 and FIG. 3 show the schematic configuration of the regulator 15. FIG. 2 shows a state where a valve 160 (described later) is fully open. FIG. 3 shows a state where the valve 160 is fully closed. A primary chamber 151 and a secondary chamber 152 are defined in a housing 150 of the regulator 15. The primary chamber 151 and the secondary chamber 152 communicate with each other via a communication passage 153.

The primary chamber 151 communicates with an inlet 154 via a passage 155. The inlet 154 is used to introduce CNG into the primary chamber 151. The inlet 154 is connected to the fuel supply tube 11 at a portion upstream of the regulator 15 (the fuel supply tube 11 at a portion from the fuel tank 2 to the regulator 15).

The secondary chamber 152 communicates with an outlet 156 via a passage 157. The outlet 156 is used to discharge CNG from the secondary chamber 152. The outlet 156 is connected to the fuel supply tube 11 at a portion downstream of the regulator 15 (the fuel supply tube 11 from the regulator 15 to the delivery pipe 18).

Note that, in the following description, the fuel supply tube 11 from the fuel tank 2 to the regulator 15 is termed "upstream fuel supply tube 11a", and the fuel supply tube 11 from the regulator 15 to the delivery pipe 18 is termed "downstream fuel supply tube 11b".

A valve stem 160b of the poppet valve 160 is accommodated in the communication passage 153. The distal end side of the valve stem 160b protrudes into the primary chamber 151. A conical valve body 160a is connected to the distal end-side end portion of the valve stem 160b. The outside diameter of the valve stem 160b is smaller than the inside diameter of the communication passage 153. CNG is allowed to flow through an annular clearance between the outer periphery of the valve stem 160b and the inner periphery of the communication passage 153. A valve seat 158 is provided around the open end of the communication passage 153 in the primary chamber 151. When the valve body 160a is seated on the valve seat 158, the open end of the communication passage 153 is closed.

The proximal end side of the valve stem 160b extends into the secondary chamber 152. The proximal end-side end portion of the valve stem 160b is connected to a holder 161. An annular diaphragm 162 is bridged between the outer periphery of the holder 161 and the inner periphery of the housing 150. The secondary chamber 152 is partitioned by the diaphragm 162 into two chambers 152a and 152b. Hereinafter, between the two chambers 152a and 152b, the chamber 152a that communicates with the outlet 156 is termed decompression chamber 152a, and the other chamber 152b is termed atmospheric chamber 152b.

A spring retainer 163 is connected to the proximal end of the holder 161. An adjusting bolt 165 is arranged at a portion facing the spring retainer 163. The adjusting bolt 165 is screwed to the housing 150. A coil spring 164 is arranged between the spring retainer 163 and the adjusting bolt 165. The coil spring 164 urges the spring retainer 163, the holder 161 and the valve 160 from the secondary chamber 152 side toward the primary chamber 151 side. Urging force that acts from the coil spring 164 on the spring retainer 163, the holder 161 and the valve 160 is adjusted by the adjusting bolt 165.

With the thus configured regulator 15, when a force based on the pressure in the decompression chamber 152a is smaller than the urging force of the coil spring 164, the spring retainer 163 and the holder 161 receive the urging force of the coil spring 164 and are then displaced from the secondary chamber 152 side toward the primary chamber 151 side. In this case, the diaphragm 162 and the valve 160 are also displaced from the secondary chamber 152 side toward the primary chamber 151 side. As a result, the valve body 160a separates from the valve seat 158 (that is, the valve 160 opens). Therefore, the primary chamber 151 and the decompression chamber 152a communicate with each other via the communication passage 153.

The outside diameter of the holder 161 is larger than the inside diameter of the open end of the communication passage 153 in the decompression chamber 152a. Therefore, when the diaphragm 162 and the valve 160 are displaced from the secondary chamber 152 side toward the primary chamber 151 side, a location that these diaphragm 162 and valve 160 can reach is restricted to a location at which the distal end of the holder 161 contacts the housing 150 around the periphery of the open end of the communication passage 153 in the decompression chamber 152a. Thus, as shown in FIG. 2, when the distal end of the holder 161 contacts the housing 150 around the periphery of the open end, the opening degree of the valve 160 (the opening area of the communication passage 153) is maximum.

When the valve 160 is open, CNG flowing from the upstream fuel supply tube 11a into the passage 155 via the inlet 154 sequentially passes through the primary chamber 151 and the communication passage 153 and flows into the decompression chamber 152a. CNG flowing into the decompression chamber 152a is supplied to the delivery pipe 18 via the passage 157, the outlet 156 and the downstream fuel supply tube 11b.

When CNG is continuously supplied from the primary chamber 151 to the decompression chamber 152a, the pressure in the decompression chamber 152a and the downstream fuel supply tube 11b increases. When a force based on the pressure in the decompression chamber 152a and the downstream fuel supply tube 11b becomes larger than the urging force of the coil spring 164, the diaphragm 162 is displaced from the primary chamber 151 side toward the secondary chamber 152 side (displaced from the decompression chamber 152a side toward the atmospheric chamber 152b side). When the diaphragm 162 is displaced from the primary chamber 151 side toward the secondary chamber 152 side, the valve 160 is also displaced from the primary chamber 151 side toward the secondary chamber 152 side. Therefore, the opening degree of the valve 160 (the opening area of the communication passage 153) reduces. Then, as shown in FIG. 3, when the valve body 160a is seated on the valve seat 158 (the valve 160 is closed), the valve 160 is fully closed (the opening area of the communication passage 153 is zero). In this case, flow of CNG from the primary chamber 151 to the decompression chamber 152a is shut off. By so doing, supply of CNG to the delivery pipe 18 is shut off.

The pressure in the delivery pipe 18 (pressure accumulating portion) is adjusted to a set pressure by the regulator 15. When the pressure in the delivery pipe 18 is higher than or equal to the set pressure, the regulator 15 is adjusted such that the valve 160 closes. That is, when the pressure in the delivery pipe 18 is lower than the set pressure, the valve 160 opens in order to supply CNG to the delivery pipe 18. With an increase in the pressure in the delivery pipe 18, the opening degree of the valve 160 (lift amount) gradually reduces. When the pressure in the delivery pipe 18 reaches the set pressure, the valve 160 closes in order to shut off supply of CNG to the delivery pipe 18.

An ECU 16 is mounted on the thus configured vehicle 100. The ECU 16 is an electronic control unit that is formed of a CPU, a ROM, a RAM, a backup RAM, and the like. Various sensors, such as the intake air temperature sensor 8, the A/F sensor 9, the first pressure sensor 10 and the second pressure sensor 19, are electrically connected to the ECU 16. Various devices, such as the fuel injection valves 4, the intake throttle valve 7 and the shutoff valve 14, are electrically connected to the ECU 16. The ECU 16 controls the various devices on the basis of signals that are input from the various sensors.

For example, the ECU 16 computes a target fuel injection amount on the basis of the engine load, engine rotation speed, and the like, of the internal combustion engine 1. The ECU 16 controls the fuel injection valves 4 in accordance with the calculated target fuel injection amount. By so doing, it is possible to bring the air-fuel ratio of air-fuel mixture that is burned in each of the cylinders 3 into coincidence with a target air-fuel ratio. As a result, it is possible to bring the power of the internal combustion engine 1 into coincidence with a driver's required power or to bring the property of exhaust gas to a property suitable for the purification performance of an exhaust emission control device.

The ECU 16 controls the shutoff valve 14 in response to on/off switching operation of an ignition switch (not shown) of the vehicle 100. That is, the ECU 16 closes the shutoff valve 14 when the ignition switch is switched to an off state. The ECU 16 opens the shutoff valve 14 when the ignition switch is switched to an on state. By so doing, the shutoff valve 14 is closed during a stop of operation of the internal combustion engine 1, and is open during operation of the internal combustion engine 1.

When the shutoff valve 14 is closed, supply of CNG to the regulator 15 is shut off. Therefore, supply of CNG to the delivery pipe 18 is also shut off. When supply of CNG to the delivery pipe 18 is shut off, CNG remaining in the delivery pipe 18 gradually escapes through the fuel injection valves 4. Therefore, the pressure in the delivery pipe 18 decreases. As a result, during a stop of operation of the internal combustion engine 1, the pressure in the delivery pipe 18 is lower than the set pressure, and the valve 160 of the regulator 15 is fully open.

When the ignition switch is switched to an on state, supply of CNG to the regulator 15 is started. By so doing, supply of CNG to the delivery pipe 18 is also started, and the pressure in the delivery pipe 18 starts to increase. With an increase in the pressure in the delivery pipe 18, the opening degree of the valve 160 of the regulator 15 gradually reduces. When the pressure in the delivery pipe 18 reaches the set pressure, the valve 160 is fully closed.

The property of CNG that is filled in the fuel tank 2 is not always uniform, and may vary among CNG refueling stations (filling stations). The air-fuel ratio (stoichiometric air-fuel ratio) at which CNG in air-fuel mixture reacts with oxygen in just proportion varies depending on the inert gas concentration of CNG.

Figure 4:
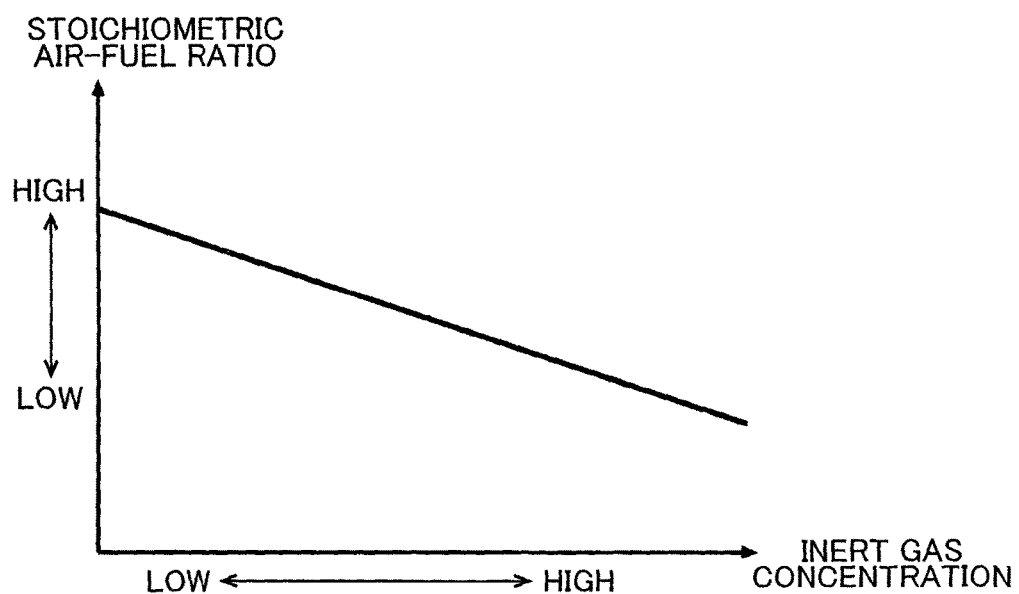
FIG. 4 is a graph that shows the correlation between an inert gas concentration of CNG and a stoichiometric air-fuel ratio.

FIG. 4 is a graph that shows the correlation between an inert gas concentration of CNG and a stoichiometric air-fuel ratio. As shown in FIG. 4, the stoichiometric air-fuel ratio in the case where CNG is used as fuel decreases as the inert gas concentration of CNG increases. Therefore, in the case where CNG (fill CNG) having different property from CNG (residual CNG) remaining in the fuel tank 2 is filled, if the fuel injection amount and the intake air flow rate after filling are controlled in accordance with the stoichiometric air-fuel ratio of the residual CNG, an actual air-fuel ratio may be different from a desired target air-fuel ratio.

For example, when fill CNG having a higher inert gas concentration than residual CNG is filled, the stoichiometric air-fuel ratio of CNG after filling (mixed CNG) is lower than the stoichiometric air-fuel ratio of the residual CNG. Therefore, if the fuel injection amount after fill CNG is filled is controlled in accordance with the stoichiometric air-fuel ratio of the residual CNG, an actual air-fuel ratio is higher than a target air-fuel ratio. As a result, this may lead to deterioration of the exhaust characteristic, a decrease in engine power, and the like.

When fill CNG having a lower inert gas concentration than residual CNG is filled, the stoichiometric air-fuel ratio of mixed CNG is higher than the stoichiometric air-fuel ratio of the residual CNG. Therefore, if the fuel injection amount after fill CNG is filled is controlled in accordance with the stoichiometric air-fuel ratio of the residual CNG, an actual air-fuel ratio is lower than a target air-fuel ratio. As a result, this may lead to deterioration of the exhaust characteristic, an increase in engine power, misfire, and the like.

When the inert gas concentration of CNG has changed, it is required to correct the fuel injection amount in order to compensate for the change in stoichiometric air-fuel ratio. Hereinafter, a method of correcting the fuel injection amount according to the present embodiment will be described with reference to FIG. 5 to FIG. 7.

Figure 5:
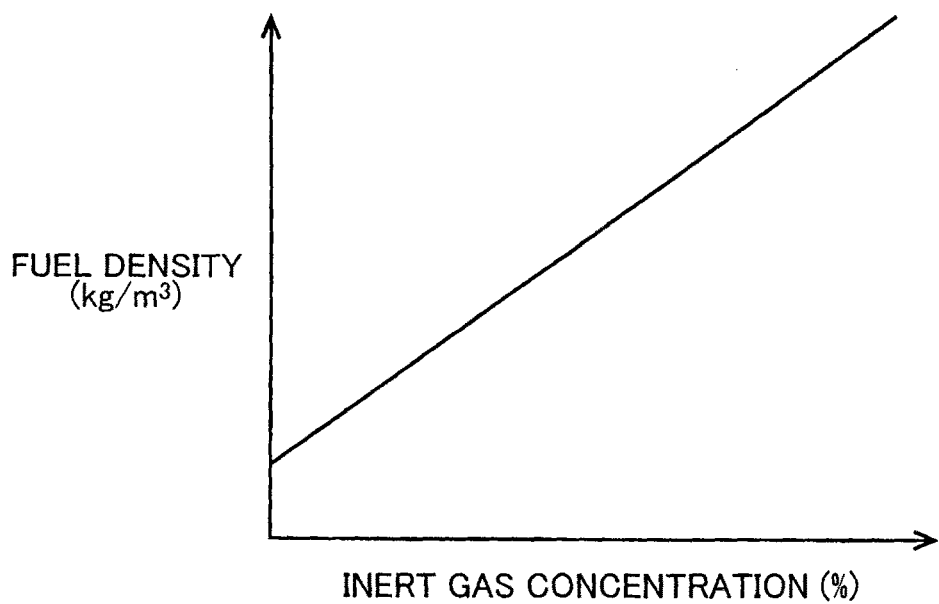
FIG. 5 is a graph that shows the correlation between an inert gas concentration of CNG and a density of CNG.
Figure 6:
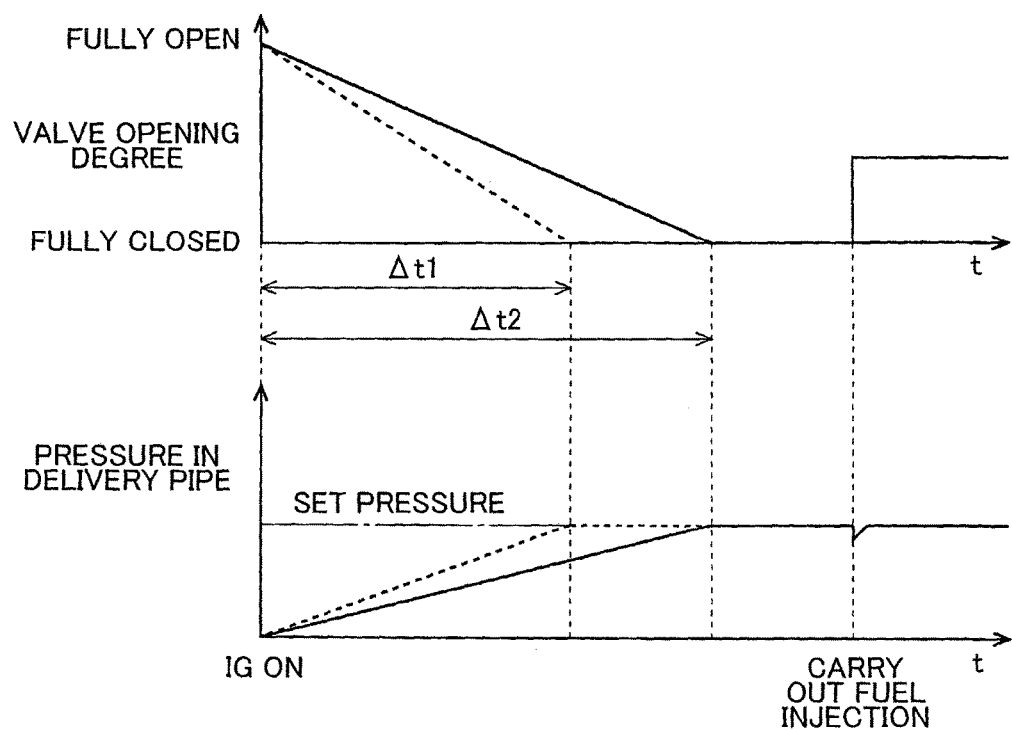
FIG. 6 is a time chart that shows changes of an opening degree of a valve of the regulator and a pressure in a delivery pipe at the time of a start of the internal combustion engine according to the first embodiment.
Figure 7:
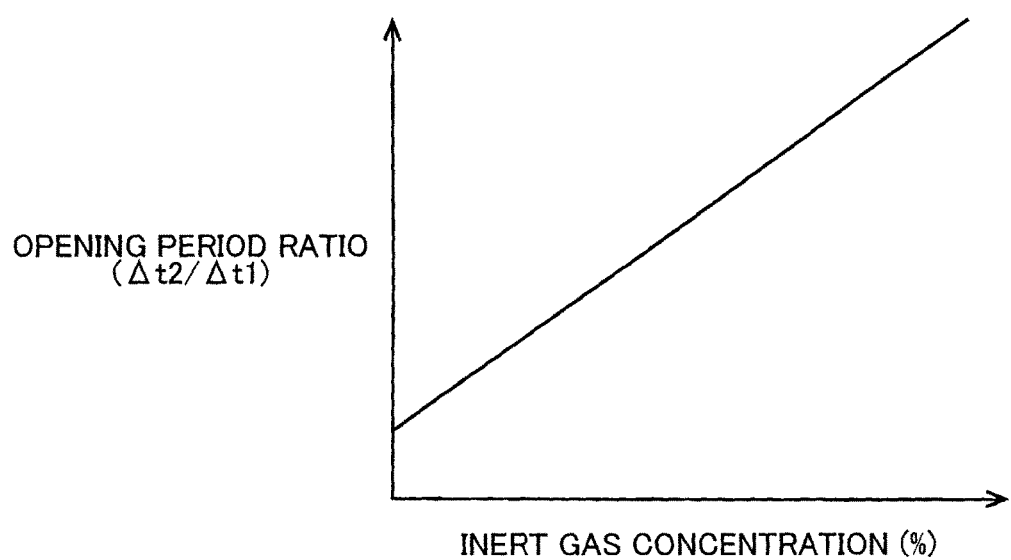
FIG. 7 is a graph that shows the correlation between an inert gas concentration of CNG and a ratio of an opening period of the valve of the regulator.

FIG. 5 is a graph that shows the correlation between an inert gas concentration of CNG and a density of CNG. FIG. 6 is a time chart that shows changes of the opening degree of the valve 160 of the regulator 15 and the pressure in the delivery pipe 18 at the time of a start of the internal combustion engine 1. FIG. 7 is a graph that shows the correlation between an inert gas concentration of CNG and a ratio of an opening period of the valve 160 of the regulator 15 (described later).

As shown in FIG. 5, the density of CNG varies with the inert gas concentration of the CNG. That is, as the inert gas concentration of CNG increases, the density of the CNG increases. Here, the correlation between the flow passage cross-sectional area of CNG and the volumetric flow rate of CNG is expressed by the following mathematical expression (1).

$$Q = C \times A \times \sqrt{(2g/\gamma) \times \Delta P} \quad (1)$$

In the above mathematical expression (1), Q denotes a volumetric flow rate, C denotes a flow rate coefficient, A denotes a flow passage cross-sectional area, g denotes a gravitational acceleration, $\gamma$ denotes a specific gravity, and $\Delta P$ denotes a differential pressure.

Therefore, the correlation between a ratio of the flow passage cross-sectional area and a ratio of the specific gravity between CNG that contains no inert gas (that is, only methane) and CNG that contains inert gas in the case where the volumetric flow rate is the same is expressed by the following mathematical expression (2).

$$A2/A1 = \sqrt{(\gamma 2/\gamma 1)} \quad (2)$$

In the above mathematical expression (2), A1 and $\gamma 1$ respectively denote the flow passage cross-sectional area and specific gravity of CNG that contains no inert gas, and A2 and $\gamma 2$ respectively denote the flow passage cross-sectional area and specific gravity of CNG that contains inert gas. That is, the relationship $\gamma 2 > \gamma 1$ holds.

Thus, as the inert gas concentration of CNG increases, the flow passage cross-sectional area that is required to obtain the same volumetric flow rate increases. In other words, when the flow passage cross-sectional area is the same, as the inert gas concentration of CNG increases, the volumetric flow rate reduces. Thus, the density of CNG varies on the basis of the inert gas concentration of the CNG. That is, as the inert gas concentration of CNG increases, the density of the CNG increases. As the density of CNG increases, the volumetric flow rate of the CNG reduces in the case where the flow passage cross-sectional area of the CNG is the same. Therefore, as the density of CNG that is supplied to the pressure accumulating portion through the regulator increases, a period from when adjustment of the pressure in the pressure accumulating portion with the use of the regulator is started to when the pressure reaches the set pressure, that is, a period until the valve element closes, extends. Thus, as the density of CNG increases, that is, as the inert gas concentration of CNG increases, the length of an adjustment period extends. During the adjustment period, the opening degree of the valve element reduces from a first predetermined opening degree to a second predetermined opening degree when the pressure in the pressure accumulating portion is adjusted to the set pressure by the regulator. Here, the first and second predetermined opening degrees each are an opening degree that is smaller than or equal to an opening degree of the fully-open valve element and is larger than or equal to an opening degree of the fully-closed valve element. The second predetermined opening degree is smaller than the first predetermined opening degree.

In the present embodiment, at the time of a start of the internal combustion engine 1, the valve 160 of the regulator 15 changes from a fully open state to a fully closed state with an increase in the pressure in the delivery pipe 18. That is, the flow passage cross-sectional area of CNG is variable, and the flow passage cross-sectional area gradually reduces during a period from when the ignition switch is switched to an on state to when the pressure in the delivery pipe 18 reaches the set pressure.

At this time, the total amount of CNG that is supplied to the delivery pipe 18, which is required to increase the pressure in the delivery pipe 18 to the set pressure, is the same irrespective of the inert gas concentration of CNG. Thus, an accumulated value of the flow passage cross-sectional area of CNG, that is, an accumulated value of the opening degree of the valve 160, in a period during which the valve 160 of the regulator 15 changes from a fully open state to a fully closed state increases as the inert gas concentration of CNG increases. That is, as shown in FIG. 6, the period during which the valve 160 of the regulator 15 changes from a fully open state to a fully closed state (hereinafter, the period is referred to as opening period) extends as the inert gas concentration of CNG increases.

In FIG. 6, the top graph shows changes of the opening degree of the valve 160 of the regulator 15 from when the ignition switch is switched to an on state, and the bottom graph shows changes of the pressure in the delivery pipe 18 after the ignition switch is switched to an on state. In FIG. 6, the broken lines indicate changes in the case where CNG contains no inert gas. The solid lines indicate changes in the case where CNG contains inert gas. As described above, in FIG. 6, an opening period $\Delta t2$ in the case where CNG contains inert gas is longer than an opening period $\Delta t1$ in the case where CNG contains no inert gas.

In FIG. 7, the abscissa axis represents the inert gas concentration of CNG that is supplied to the delivery pipe 18 (CNG that is actually subjected to combustion). The ordinate axis represents the ratio (opening period ratio) of the length of the opening period $\Delta t2$ corresponding to the above CNG with respect to the opening period $\Delta t1$ corresponding to CNG that contains no inert gas. As shown in FIG. 7, as the inert gas concentration of CNG that is supplied to the delivery pipe 18 increases, the opening period ratio ($\Delta t2/\Delta t1$) increases.

In the present embodiment, the opening period of the valve 160 is detected at the time of a start of the internal combustion engine 1. The fuel injection amount (control parameter) at the time of carrying out fuel injection from the fuel injection valves 4 is corrected on the basis of the detected length of the opening period. That is, as the opening period of the valve 160 at the time of an engine start extends, it may be determined that the inert gas concentration of CNG increases, so the fuel injection amount is increased.

Figure 8:
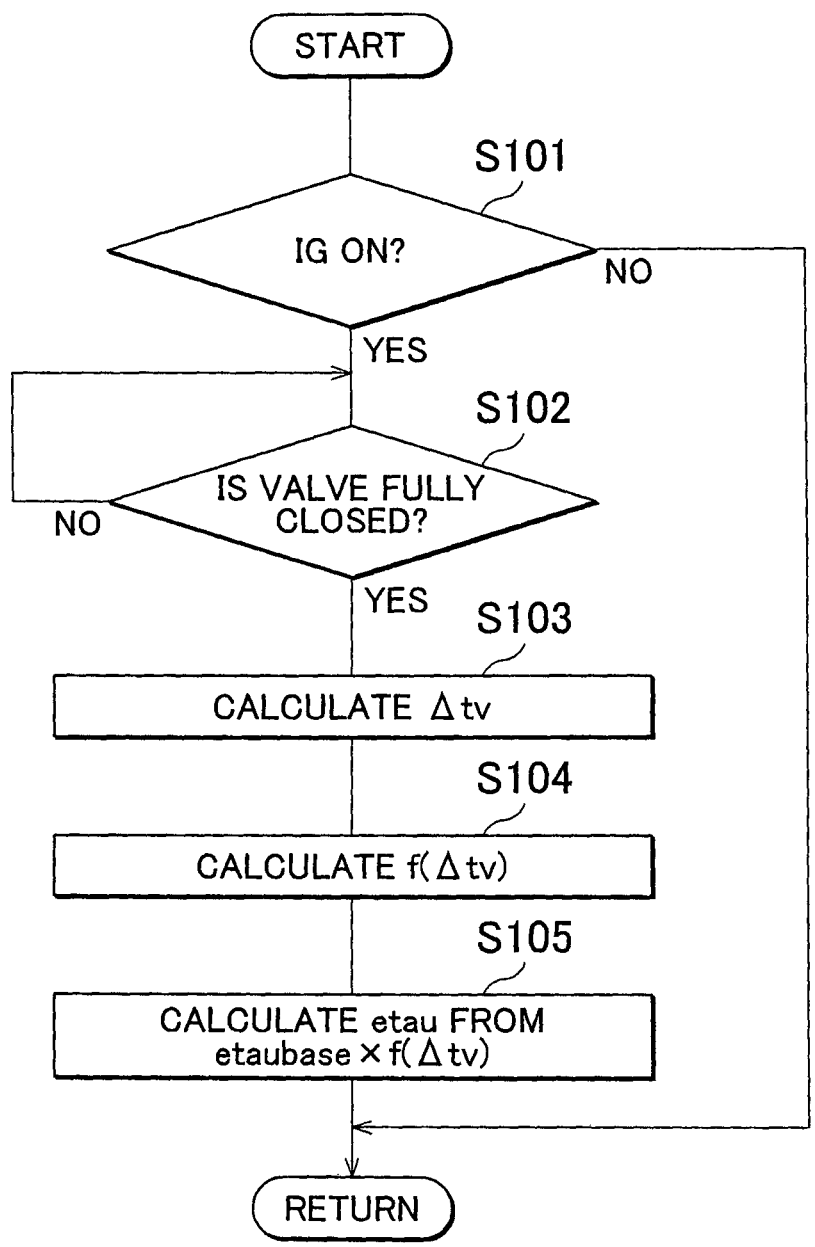
FIG. 8 is a flowchart that shows the flow of computing a fuel injection amount according to the first embodiment.

FIG. 8 is a flowchart that shows the flow of computing the fuel injection amount according to the present embodiment. The fuel injection amount is determined by the opening duration (fuel injection duration) of each fuel injection valve 4 at the time of carrying out fuel injection. Therefore, in this flow, the fuel injection amount is calculated as the fuel injection duration. The flow is prestored in the ECU 16, and is repeatedly executed by the ECU 16.

In this flow, first, in step S101, it is determined whether the ignition switch is switched to an on state (IGON). When negative determination is made in step S101, the flow ends. When affirmative determination is made, the process of step S102 is subsequently executed.

As described above, when the ignition switch is switched to, an on state, the ECU 16 executes a flow different from this flow to open the shutoff valve 14. By so doing, supply of CNG to the delivery pipe 18 via the regulator 15 is started. As a result, as shown in FIG. 6, the opening degree of the valve 160 of the fully-open regulator 15 starts to reduce.

In step S102, it is determined whether the valve 160 of the regulator 15 is fully closed. Here, when the pressure in the delivery pipe 18, which is detected by the second pressure sensor 19, has reached the set pressure, it may be determined that the valve 160 is fully closed. Alternatively, it is applicable that a sensor that detects the opening degree (lift amount) of the valve 160 is additionally provided and it is determined whether the valve 160 is fully closed on the basis of a detected value of the sensor.

When negative determination is made in step S102, the process of step S102 is executed again. When affirmative determination is made, the process of step S103 is subsequently executed. In step S103, the opening period $\Delta tv$ of the valve 160 is calculated. Here, the opening period $\Delta tv$ is calculated as the length of a period from when it is determined in step S101 that the ignition switch is changed to an on state to when it is determined in step S102 that the valve 160 is fully closed.

Figure 9:
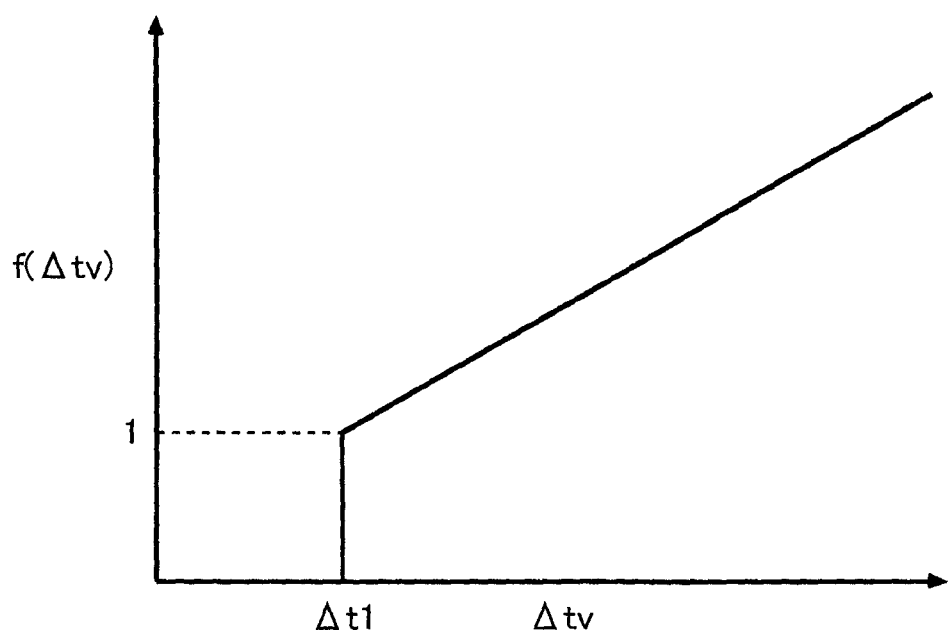
FIG. 9 is a graph that shows the correlation between a length $\Delta tv$ of the opening period of the valve of the regulator and a correction coefficient $f(\Delta tv)$ according to the first embodiment.

Subsequently, in step S104, a correction coefficient $f(\Delta tv)$ that is used to correct the fuel injection duration is calculated on the basis of the opening period $\Delta tv$ of the valve 160 calculated in step S103. FIG. 9 is a graph that shows the correlation between an opening period $\Delta tv$ of the valve 160 and a correction coefficient $f(\Delta tv)$. As shown in FIG. 9, the correction coefficient $f(\Delta tv)$ is a value larger than or equal to 1, and becomes a larger value as the opening period extends. The opening period that corresponds to the correction coefficient $f(\Delta tv)=1$ is the opening period $\Delta t1$ in the case where CNG contains no inert gas.

The correlation between a length $\Delta tv$ of the opening period of the valve 160 and a correction coefficient $f(\Delta tv)$, shown in FIG. 9, may be determined in advance on the basis of an experiment, or the like, and is stored in the ECU 16 as a map or a function. In step S104, the correction coefficient $f(\Delta tv)$ is calculated using the map or function.

Subsequently, in step S105, a fuel injection duration etau is calculated by multiplying a reference fuel injection duration etaubase by the correction coefficient f(Δtv) calculated in step S104. By so doing, as the opening period of the valve 160 extends, the fuel injection duration etau extends (that is, the fuel injection amount increases). The reference fuel injection duration etaubase is a reference value of fuel injection duration, which is calculated on the basis of the engine load, engine rotation speed, and the like, of the internal combustion engine 1.

According to the above flow, as the opening period of the valve 160 at the time of a start of the internal combustion engine 1 extends, that is, as the inert gas concentration of CNG increases, the fuel injection amount at the time of carrying out fuel injection from the fuel injection valves 4 is increased. Therefore, it is possible to control the air-fuel ratio of air-fuel mixture to the stoichiometric air-fuel ratio based on the inert gas concentration of CNG that is actually subjected to combustion in the internal combustion engine 1. Thus, even when the inert gas concentration of CNG has changed due to, for example, refueling of new CNG, it is possible to properly operate the internal combustion engine 1.

Furthermore, according to the above flow, at the time of a start of the internal combustion engine 1, it is possible to set the fuel injection amount to a proper value based on the inert gas concentration of CNG at the time point before fuel injection from the fuel injection valves 4 is started, that is, the time point before air-fuel mixture is burned. Therefore, it is possible to properly operate the internal combustion engine 1 immediately after a start of the internal combustion engine 1. That is, it is possible to stabilize a combustion state immediately after a start of the internal combustion engine 1, and it is possible to improve the exhaust characteristic.

It is not always required to execute the above-described flow each time the internal combustion engine 1 is started. Actually, the inert gas concentration of CNG that is subjected to combustion in the internal combustion engine 1 significantly varies when new CNG is refueled into the fuel tank 2. Therefore, after new CNG is refueled to the fuel tank 2, the above-described flow is executed at the time when the internal combustion engine 1 is started for the first time. The correction coefficient f(Δtv) for the fuel injection duration calculated at the time when the above-described flow is executed may be stored in the ECU 16. Until new CNG is refueled to the fuel tank 2 next time, the fuel injection duration may be corrected by the correction coefficient f(Δtv) stored in the ECU 16.

The timing at which the fuel injection duration is calculated by executing the processes of steps S102 to S105 of the above-described flow is not necessarily the timing at which the internal combustion engine is started. For example, in the case of a so-called bifuel engine that is able to supply liquid fuel, such as gasoline, in addition to CNG as fuel to an internal combustion engine via another path different from a CNG supply path, when the internal combustion engine 1 is operated using the liquid fuel as fuel, the processes of steps S102 to S105 of the above-described flow may be executed. In this case, when the internal combustion engine is operated using the liquid fuel as fuel, the shutoff valve 14 is closed and CNG in the delivery pipe 18 is once released, and, after that, the shutoff valve 14 is opened, and the processes of steps S102 to S105 of the above-described flow are executed.

In the above description, the fuel injection amount is corrected on the basis of the opening period that is a period during which the valve 160 of the regulator 15 changes from a fully open state to a fully closed state. Instead, the fuel injection amount may be corrected on the basis of another parameter that correlates with the opening period. For example, when a sensor that detects the opening degree (lift amount) of the valve 160 is provided at the regulator 15, either a period from when the valve 160 is fully open to when the opening degree of the valve 160 is reduced to a predetermined opening degree that is larger than an opening degree of the fully-closed valve 160 or a period from when the opening degree of the valve 160 is a predetermined opening degree that is smaller than an opening degree of the fully-open valve 160 to when the valve 160 is fully closed can be detected. Then the fuel injection amount is corrected on the basis of the detected period. Alternatively, it is applicable that first and second predetermined opening degrees, each of which is smaller than the opening degree of the fully-open valve 160 and is larger than the opening degree of the fully-closed valve 160, are set in advance and then the fuel injection amount is corrected on the basis of a period during which the opening degree of the valve 160 reduces from the first predetermined opening degree to the second predetermined opening degree.

A parameter that correlates with the opening period of the valve 160 may be, for example, the amount of reduction in the opening degree of the valve 160 per unit time (that is, the slope of a variation in the opening degree) in a period during which the valve 160 changes from a fully open state to a fully closed state, the opening degree of the valve 160 at the time point at which a predetermined period of time has elapsed from the time point at which the opening degree of the valve 160 starts to reduce (the time point at which the ignition switch is switched to an on state) or an accumulated value of the opening degree of the valve 160 in a period during which the valve 160 changes from a fully open state to a fully closed state.

A control parameter relating to a combustion state in the internal combustion engine, other than the fuel injection amount, may be corrected on the basis of the opening period of the valve of the regulator or a parameter that correlates with the opening period of the valve of the regulator. The control parameter that correlates with a combustion state in the internal combustion engine, other than the fuel injection amount, may be, for example, an ignition timing, an EGR gas amount in an internal combustion engine that includes an EGR system or a valve timing of at least any one of intake valves or exhaust valves in an internal combustion engine that includes a variable valve timing mechanism.

For example, the combustion rate of air-fuel mixture decreases when the inert gas concentration of CNG is high as compared with when the inert gas concentration of CNG is low. As the inert gas concentration of CNG increases, that is, as the opening period of the valve of the regulator extends, the ignition timing may be advanced. With this configuration, even when the inert gas concentration of CNG has changed, it is possible to suppress a change in the combustion end timing of air-fuel mixture.

In the internal combustion engine that includes the EGR system, the opening degree of an EGR valve may be corrected such that an EGR gas amount reduces as the inert gas concentration of CNG increases, that is, as the opening period of the valve of the regulator extends. In the internal combustion engine that includes the variable valve timing mechanism, the valve timing of at least any one of the intake valves and the exhaust valves may be corrected such that burned fuel (internal EGR gas) remaining in the cylinders 3 reduces as the inert gas concentration of CNG increases, that is, as the opening period of the valve of the regulator extends. With these configurations, even when the inert gas concentration of CNG has changed, it is possible to suppress a change in the combustion rate of air-fuel mixture.

The schematic configuration of a vehicle on which an internal combustion engine that uses CNG as fuel according to a second embodiment is similar to that of the first embodiment. Hereinafter, the difference from the first embodiment in a method of correcting a fuel injection amount according to the present embodiment will be described.

As described above, the opening period of the valve 160 of the regulator 15 varies on the basis of the inert gas concentration of CNG. In the present embodiment, the inert gas concentration of CNG is estimated on the basis of the opening period of the valve 160 of the regulator 15. The fuel injection amount at the time of carrying out fuel injection from the fuel injection valves 4 is corrected on the basis of the estimated inert gas concentration of CNG. That is, as the inert gas concentration of CNG increases, the fuel injection amount is increased.

Figure 10:
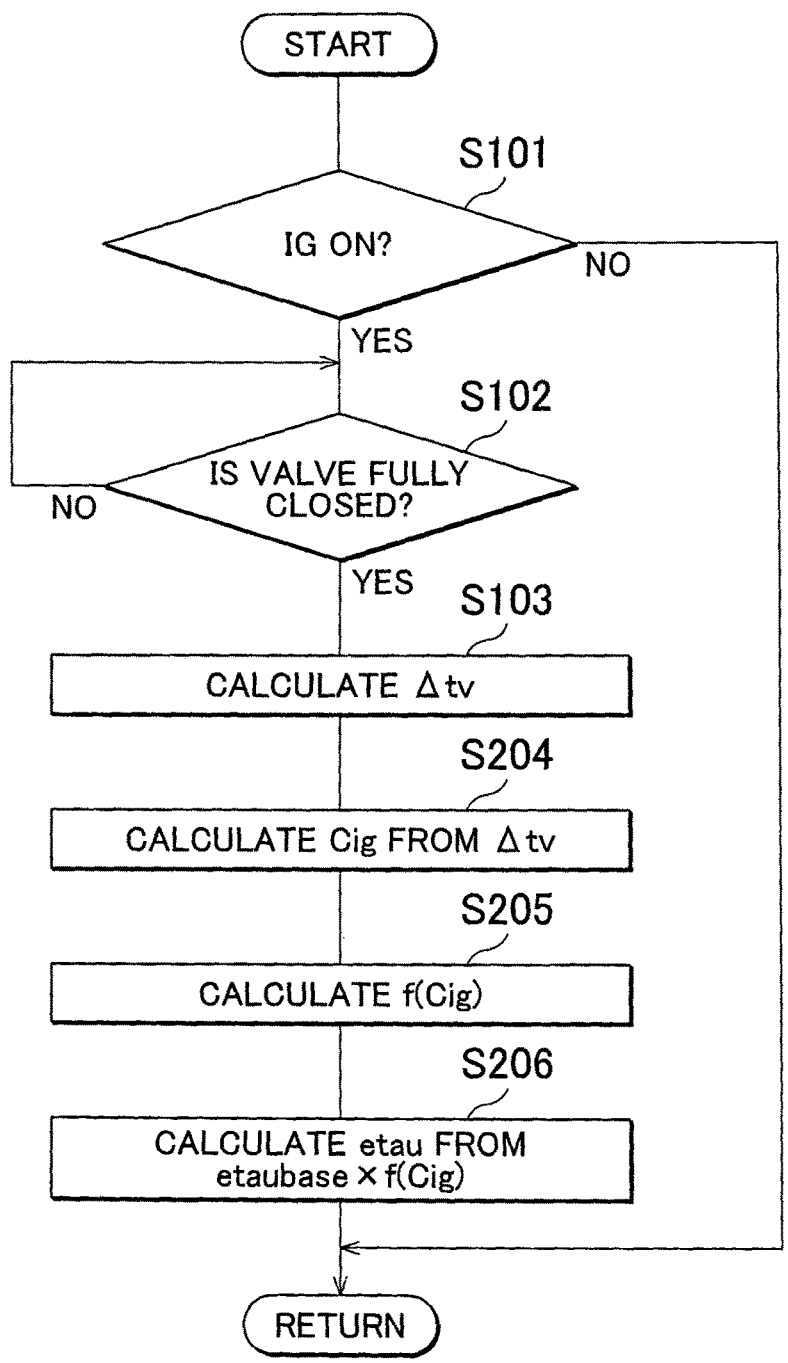
FIG. 10 is a flowchart that shows the flow of computing a fuel injection amount according to a second embodiment.

FIG. 10 is a flowchart that shows the flow of computing the fuel injection amount according to the present embodiment. The flow is prestored in the ECU 16, and is repeatedly executed by the ECU 16. In this flow, steps S104 and S105 of the flow shown in FIG. 8 are replaced with steps S204 to S206. Therefore, the description of the processes in steps other than steps S204 to S206 is omitted.

In this flow, when the opening period Δtv of the valve 160 is calculated in step S103, the process of step S204 is subsequently executed. In step S204, the inert gas concentration Cig of CNG supplied to the delivery pipe 18 this time is calculated on the basis of the opening period Δtv of the valve 160 calculated in step S103.

As described above, as the inert gas concentration Cig of CNG increases, the opening period of the valve 160 extends. The above correlation between the inert gas concentration Cig of CNG and the opening period Δtv of the valve 160 is stored in the ECU 16 as a map or a function. In step S204, the inert gas concentration Cig of CNG is calculated using the map or function.

Figure 11:
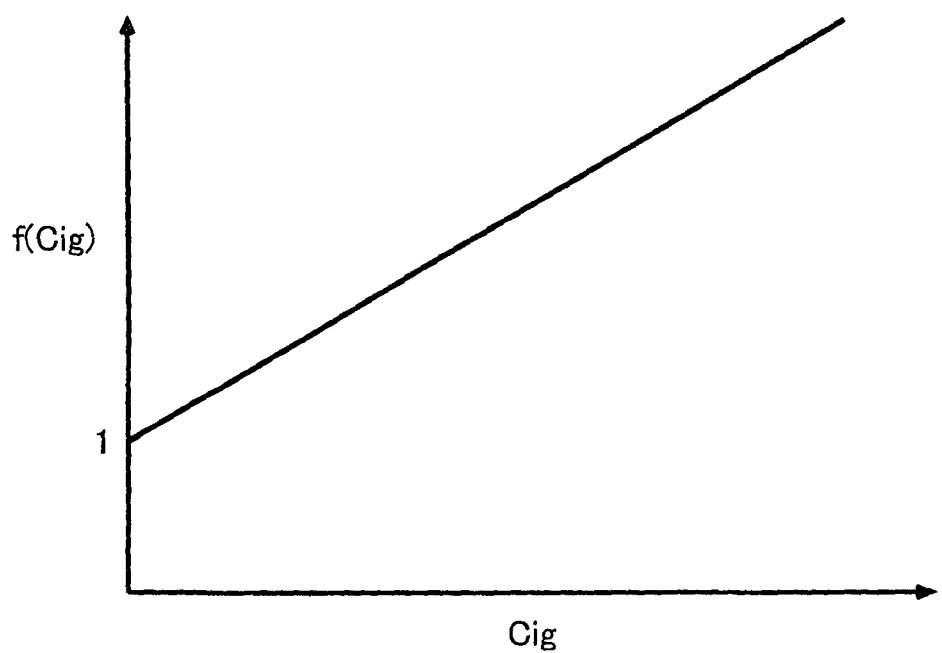
FIG. 11 is a view that shows the correlation between an inert gas concentration Cig of CNG and a correction coefficient $f(Cig)$ according to the second embodiment.

Subsequently, in step S205, the correction coefficient f(Cig) that is used to correct the fuel injection duration is calculated on the basis of the inert gas concentration Cig of CNG, calculated in step S204. FIG. 11 is a graph that shows the correlation between an inert gas concentration Cig of CNG and a correction coefficient f(Cig). As shown in FIG. 11, the correction coefficient f(Cig) is a value larger than or equal to 1, and becomes a larger value as the opening period extends. When the inert gas concentration Cig of CNG is zero (that is, when CNG contains no inert gas), the correction coefficient f(Cig) is 1.

The correlation between an inert gas concentration Cig of CNG and a correction coefficient f(Cig), shown in FIG. 11, may be determined in advance on the basis of an experiment, or the like, and is stored in the ECU 16 as a map or a function. In step S205, the correction coefficient f(Cig) is calculated using the map or function.

Subsequently, in step S206, the fuel injection duration etau is calculated by multiplying the reference fuel injection duration etaubase by the correction coefficient f(Cig) calculated in step S205. By so doing, as the inert gas concentration Cig of CNG increases, the fuel injection duration etau extends (that is, the fuel injection amount increases).

According to the above-described flow, as in the case of the flow of computing the fuel injection amount according to the first embodiment, it is possible to control the air-fuel ratio of air-fuel mixture to the stoichiometric air-fuel ratio based on the inert gas concentration of CNG that is actually subjected to combustion in the internal combustion engine 1. Thus, even when the inert gas concentration of CNG has changed due to, for example, refueling of new CNG, it is possible to properly operate the internal combustion engine 1. In addition, at the time of a start of the internal combustion engine 1, it is possible to detect the inert gas concentration of CNG at the time point before fuel injection from the fuel injection valves 4 is started, that is, the time point before air-fuel mixture is burned, so it is possible to set the fuel injection amount to a proper value based on the inert gas concentration of CNG. Therefore, it is possible to properly operate the internal combustion engine 1 immediately after a start of the internal combustion engine 1.

Steps S101 to S103, and S204 in the above-described flow may constitute an inert gas concentration detecting device that is used to detect the inert gas concentration of CNG.

As in the case of the alternative embodiment to the first embodiment in which the fuel injection amount is corrected on the basis of another parameter that correlates with the opening period of the valve 160 of the regulator 15, in the present embodiment as well, the inert gas concentration of CNG may be calculated on the basis of another parameter that correlates with the opening period. In addition, a control parameter relating to a combustion state in the internal combustion engine, other than the fuel injection amount, may be corrected on the basis of the inert gas concentration of CNG.

The schematic configuration of a vehicle on which an internal combustion engine that uses CNG as fuel according to a third embodiment is similar to that of the first embodiment. Hereinafter, the difference from the first embodiment in a method of correcting a fuel injection amount according to the present embodiment will be described.

The pressure in the fuel tank 2 varies on the basis of the amount of CNG that is stored in the fuel tank 2. That is, as the amount of CNG that is stored in the fuel tank 2 reduces, the pressure in the fuel tank 2 decreases. As the amount of CNG that is stored in the fuel tank 2 increases by refueling new CNG into the fuel tank 2, the pressure in the fuel tank 2 increases.

Even when the density of CNG that is supplied to the delivery pipe 18 through the regulator 15 is the same, the volumetric flow rate of CNG in the case where the flow passage cross-sectional area of CNG is the same varies on the basis of the pressure of CNG on the upstream side of the regulator 15, that is, the pressure in the fuel tank 2. That is, the volumetric flow rate of CNG in the case where the flow passage cross-sectional area of CNG is the same increases when the pressure in the fuel tank 2 is high as compared with when the pressure in the fuel tank 2 is low. Therefore, even when the density of CNG that is supplied to the delivery pipe 18 through the regulator 15 is the same, that is, even when the inert gas concentration of CNG is the same, as the pressure in the fuel tank 2 increases, adjustment of the pressure in the delivery pipe 15 by the regulator 15 is started, and the opening period of the valve 160 of the regulator 15 reduces.

In the present embodiment, the fuel injection amount at the time of carrying out fuel injection from the fuel injection valves 4 is corrected on the basis of the pressure in the fuel tank 2 in addition to the length of the opening period of the valve 160 of the regulator 15. That is, as in the case of the first embodiment, the fuel injection amount is increased as the opening period of the valve 160 at the time of an engine start extends, and the fuel injection amount is increased as the pressure in the fuel tank 2 increases (the amount of increase in the fuel injection amount with respect to the length of the opening period of the valve 160 is increased as the pressure in the fuel tank 2 increases).

Figure 12:
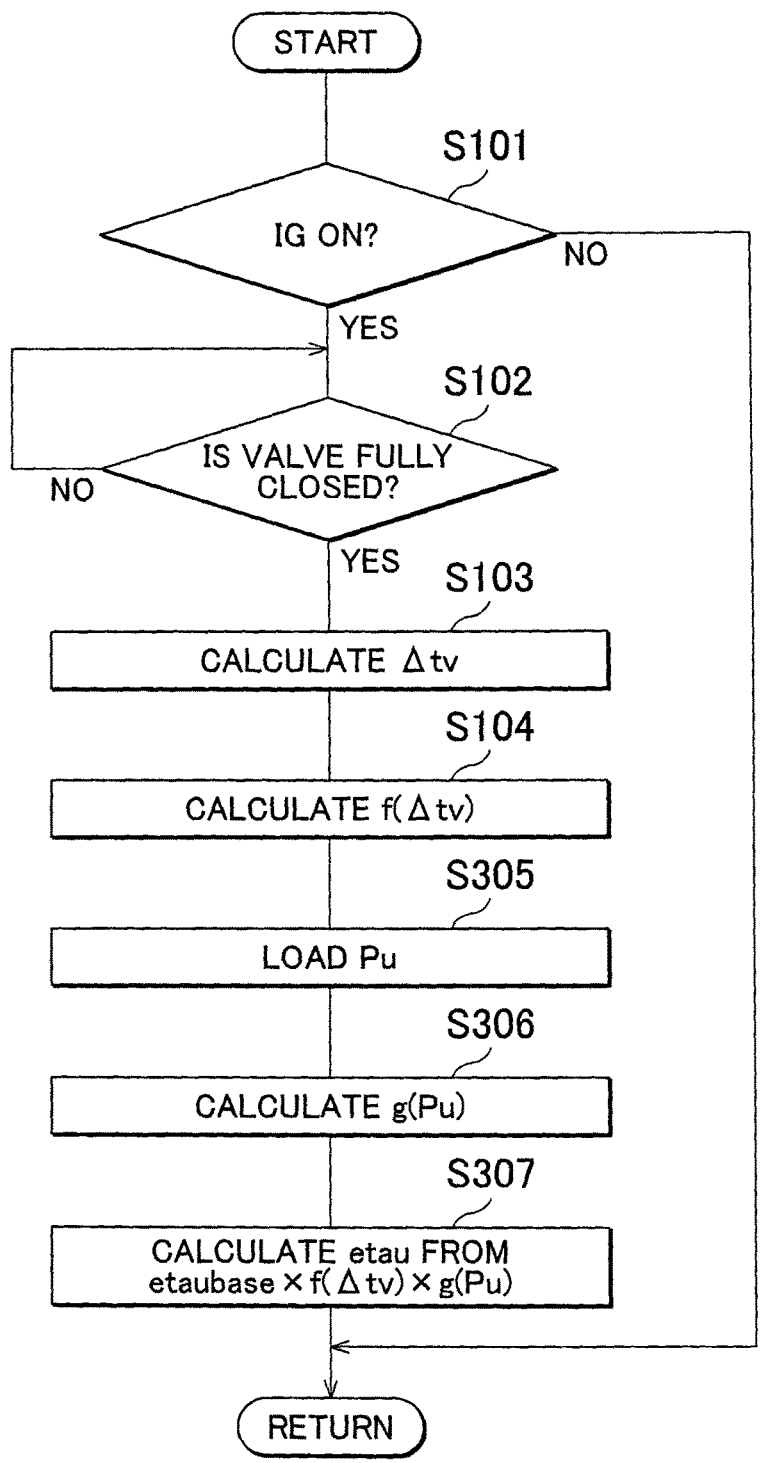
FIG. 12 is a flowchart that shows the flow of computing a fuel injection amount according to a third embodiment.

FIG. 12 is a flowchart that shows the flow of computing the fuel injection amount according to the present embodiment. The flow is prestored in the ECU 16, and is repeatedly executed by the ECU 16. In this flow, step S105 of the flow shown in FIG. 8 is replaced with steps S305 to S307. Therefore, the description of the processes in steps other than steps S305 to S307 is omitted.

In this flow, when the correction coefficient f(Δtv) is calculated on the basis of the opening period Δtv of the valve 160 in step S104, the process of step S305 is subsequently executed. In step S305, a pressure Pu in the fuel tank 2 that is detected by the first pressure sensor 10 is loaded.

Figure 13:
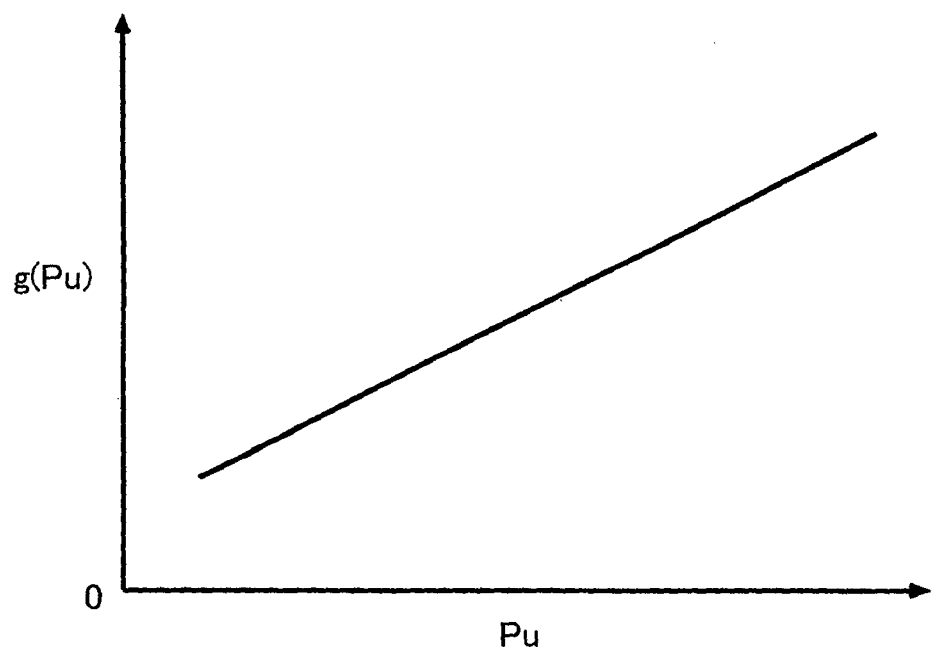
FIG. 13 is a graph that shows the correlation between a pressure Pu in a fuel tank and a correction coefficient $g(Pu)$ according to the third embodiment.

Subsequently, in step S306, a correction coefficient g(Pu) that is used to correct the fuel injection duration is calculated on the basis of the pressure Pu in the fuel tank 2, loaded in step S305. FIG. 13 is a graph that shows the correlation between a pressure Pu in the fuel tank 2 and a correction coefficient g(Pu). As shown in FIG. 13, the correction coefficient g(Pu) is a value larger than zero, and becomes a larger value as the pressure Pu in the fuel tank 2 increases.

The correlation between a pressure Pu in the fuel tank 2 and a correction coefficient g(Pu), shown in FIG. 13, may be determined in advance on the basis of an experiment, or the like, and is stored in the ECU 16 as a map or a function. In step S306, the correction coefficient g(Pu) is calculated using the map or function.

Subsequently, in step S307, the fuel injection duration etau is calculated by multiplying the reference fuel injection duration etaubase by the correction coefficient f(Δtv) calculated in step S104 and the correction coefficient g(Pu) calculated in step S306. By so doing, as the opening period extends, the fuel injection duration etau extends (that is, the fuel injection amount increases), and, as the pressure in the fuel tank 2 increases, the fuel injection duration etau extends (that is, the fuel injection amount increases).

According to the above-described flow, the fuel injection amount at the time of carrying out fuel injection from the fuel injection valves 4 is determined in consideration of not only the opening period of the valve 160 at the time of a start of the internal combustion engine 1 but also the pressure in the fuel tank 2. Therefore, it is possible to further highly accurately control the air-fuel ratio of air-fuel mixture to the stoichiometric air-fuel ratio based on the inert gas concentration of CNG that is actually subjected to combustion in the internal combustion engine 1.

In the above embodiment, the fuel injection amount is corrected on the basis of not only the length of the opening period of the valve 160 of the regulator 15 but also the pressure in the fuel tank 2. However, the fuel injection amount may be corrected using another parameter that correlates with the pressure in the fuel tank 2. For example, it is applicable that a pressure sensor that detects the pressure in the upstream fuel supply tube 11a is provided and then the fuel injection amount is corrected on the basis of the detected pressure. As the temperature of CNG in the fuel tank 2 increases, the pressure in the fuel tank 2 inevitably increases. Therefore, it is applicable that a temperature sensor that detects the temperature of CNG in the fuel tank 2 is provided and then the fuel injection amount is corrected on the basis of the temperature.

In the present embodiment as well, as in the case of the alternative embodiment to the first embodiment, the fuel injection amount may be corrected on the basis of another parameter that correlates with the opening period of the valve 160 of the regulator 15, instead of the opening period itself. A control parameter relating to a combustion state in the internal combustion engine, other than the fuel injection amount, may be corrected on the basis of the opening period of the valve 160 of the regulator 15 or a parameter that correlates with the opening period and the pressure in the fuel tank 2 or a parameter that correlates with the pressure.

The schematic configuration of a vehicle on which an internal combustion engine that uses CNG as fuel according to a fourth embodiment is similar to that of the first embodiment. Hereinafter, the difference from the second embodiment in a method of correcting a fuel injection amount according to the present embodiment will be described.

As described above, the opening period of the valve 160 of the regulator 15 varies on the basis of not only the inert gas concentration of CNG but also the pressure in the fuel tank 2. In the present embodiment, the inert gas concentration of CNG is estimated on the basis of not only the opening period of the valve 160 of the regulator 15 but also the pressure in the fuel tank 2. The fuel injection amount at the time of carrying out fuel injection from the fuel injection valves 4 is corrected on the basis of the estimated inert gas concentration of CNG.

Figure 14:
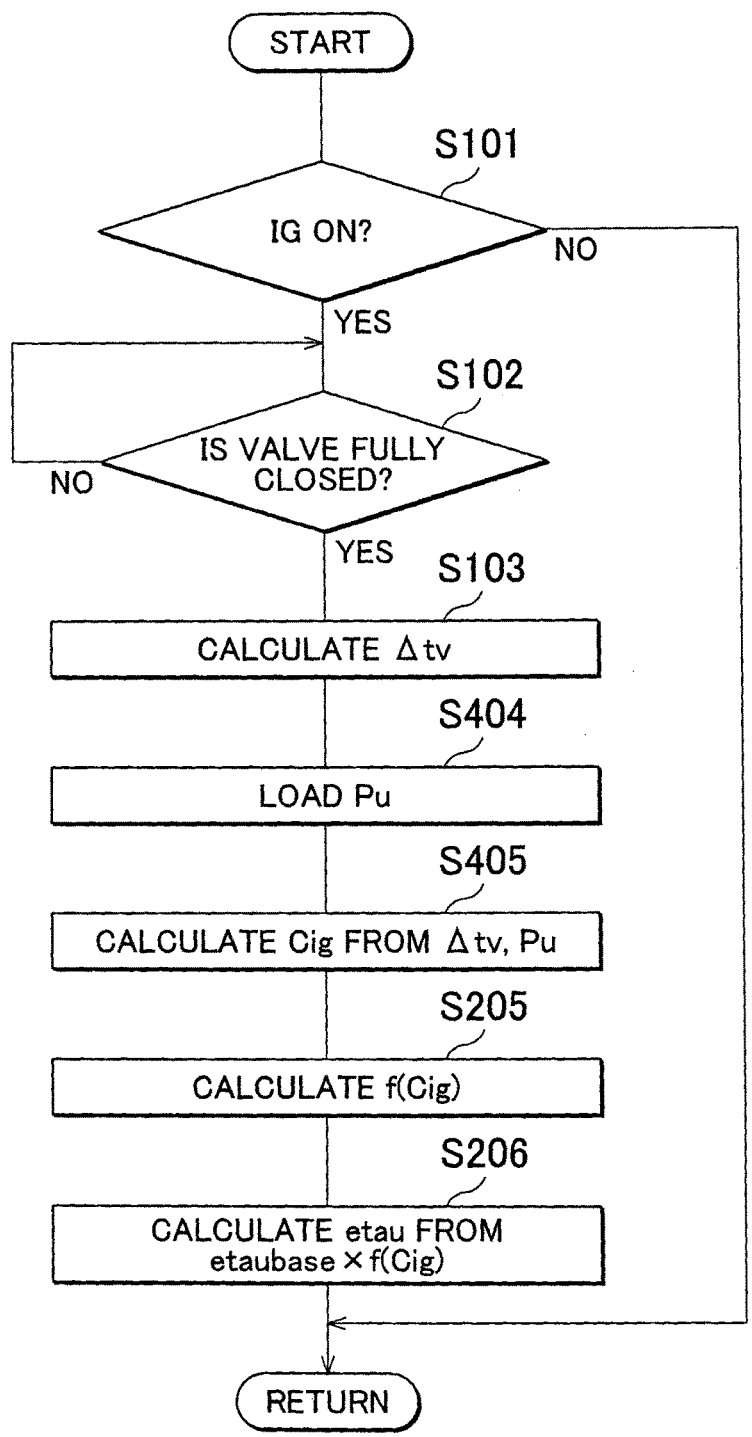
FIG. 14 is a flowchart that shows the flow of computing a fuel injection amount according to a fourth embodiment.

FIG. 14 is a flowchart that shows the flow of computing the fuel injection amount according to the present embodiment. The flow is prestored in the ECU 16, and is repeatedly executed by the ECU 16. In this flow, step S204 of the flow shown in FIG. 10 is replaced with steps S404 and S405. Therefore, the description of the processes in steps other than steps S404 and S405 is omitted.

In this flow, when the opening period Δtv of the valve 160 is calculated in step S103, the process of step S404 is subsequently executed. In step S404, a pressure Pu in the fuel tank 2 that is detected by the first pressure sensor 10 is loaded.

Subsequently, in step S405, the inert gas concentration Cig of CNG supplied to the delivery pipe 18 this time is calculated on the basis of the opening period Δtv of the valve 160, calculated in step S103, and the pressure Pu in the fuel tank 2, loaded in step S404.

As described above, as the inert gas concentration Cig of CNG increases, the opening period of the valve 160 extends. Even when the inert gas concentration Cig of CNG is the same, as the pressure Pu in the fuel tank 2 increases, the opening period of the valve 160 reduces. The above correlation among the inert gas concentration Cig of CNG, the opening period Δtv of the valve 160 and the pressure Pu in the fuel tank 2 is stored in the ECU 16 as a map or a function. In step S405, the inert gas concentration Cig of CNG is calculated using the map or function. After that, the processes of steps S205 and S206 are executed.

According to the above-described flow, the inert gas concentration of CNG is calculated in consideration of not only the opening period of the valve 160 at the time of a start of the internal combustion engine 1 but also the pressure in the fuel tank 2. Therefore, it is possible to further highly accurately calculate the inert gas concentration of CNG. As a result, as in the case of the flow of computing the fuel injection amount according to the third embodiment, it is possible to further highly accurately control the air-fuel ratio of air-fuel mixture to the stoichiometric air-fuel ratio based on the inert gas concentration of CNG that is actually subjected to combustion in the internal combustion engine 1.

Steps S101 to S103, S404 and S405 in the above-described flow may constitute an inert gas concentration detecting device that is used to detect the inert gas concentration of CNG.

As in the case of the alternative embodiment to the third embodiment in which the fuel injection amount is corrected on the basis of another parameter that correlates with the pressure in the fuel tank 2, in the present embodiment as well, the inert gas concentration of CNG may be calculated on the basis of another parameter that correlates with the pressure.

In the present embodiment as well, as in the case of the alternative embodiment to the second embodiment, the inert gas concentration of CNG may be calculated on the basis of another parameter that correlates with the opening period of the valve 160 of the regulator 15 instead of the opening period. A control parameter relating to a combustion state in the internal combustion engine, other than the fuel injection amount, may be corrected on the basis of the inert gas concentration of CNG.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

The invention claimed is:

1. A control system for an internal combustion engine that uses compressed natural gas as fuel, comprising:
   a pressure accumulating portion that stores compressed natural gas, which is injected from a fuel injection valve of the internal combustion engine, in a state where the compressed natural gas is kept at a set pressure, and that supplies compressed natural gas to the fuel injection valve;
   a regulator including a valve element that opens when the compressed natural gas is supplied to the pressure accumulating portion and closes when supply of the compressed natural gas to the pressure accumulating portion is shut off, so that the regulator adjusts a pressure in the pressure accumulating portion to the set pressure; and
   a control unit that, when the pressure in the pressure accumulating portion is being adjusted to the set pressure by the regulator, controls a control parameter relating to a combustion state in the internal combustion engine on the basis of a duration of a period during which an opening degree of the valve element reduces from a first predetermined opening degree to a second predetermined opening degree,
   wherein the regulator starts adjusting the pressure in the pressure accumulating portion when an ignition is switched to an on state.

2. The control system according to claim 1, wherein
   the regulator is arranged in a fuel supply passage that leads compressed natural gas to the pressure accumulating portion.

3. The control system according to claim 1, wherein
   the control unit controls the control parameter relating to a combustion state in the internal combustion engine on the basis of, besides the duration of the period during which the opening degree of the valve element of the regulator reduces from the first predetermined opening degree to the second predetermined opening degree, either a pressure of compressed natural gas on an upstream side of the regulator or a parameter that correlates with the pressure of the compressed natural gas on the upstream side of the regulator.

4. The control system according to claim 1, wherein
   the duration of the period during which the opening degree of the valve element of the regulator reduces from the first predetermined opening degree to the second predetermined opening degree is a duration during which the compressed natural gas is injected into the pressure accumulating portion.

5. An inert gas concentration detecting device that detects a concentration of an inert gas contained in compressed natural gas in an internal combustion engine that uses compressed natural gas as fuel, comprising:
   a pressure accumulating portion that stores compressed natural gas, which is injected from a fuel injection valve of the internal combustion engine, in a state where the compressed natural gas is kept at a set pressure, and that supplies compressed natural gas to the fuel injection valve;
   a regulator including a valve element that opens when the compressed natural gas is supplied to the pressure accumulating portion and closes when supply of the compressed natural gas to the pressure accumulating portion is shut off, so that the regulator adjusts a pressure in the pressure accumulating portion to the set pressure; and
   an estimating unit that, when the pressure in the pressure accumulating portion is adjusted to the set pressure by the regulator, estimates a concentration of the inert gas contained in compressed natural gas on the basis of a duration of a period during which an opening degree of the valve element reduces from a first predetermined opening degree to a second predetermined opening degree,
   wherein the regulator starts adjusting the pressure in the pressure accumulating portion when an ignition switch is switched to an on state.

6. The inert gas concentration detecting device according to claim 5, wherein
   the regulator is arranged in a fuel supply passage that leads compressed natural gas to the pressure accumulating portion.

7. The inert gas concentration detecting device according to claim 5, wherein
   the estimating unit estimates the concentration of the inert gas contained in compressed natural gas on the basis of, besides the duration of the period during which the opening degree of the valve element of the regulator reduces from the first predetermined opening degree to the second predetermined opening degree, either a pressure of compressed natural gas on an upstream side of the regulator or a parameter that correlates with the pressure of the compressed natural gas on the upstream side of the regulator.

8. A control system for an internal combustion engine, comprising:
   a control unit that controls a control parameter relating to a combustion state in the internal combustion engine on the basis of a concentration of an inert gas contained in compressed natural gas, the concentration of inert gas being estimated by the estimating unit of the inert gas concentration detecting device according to claim 5.

9. The control system according to claim 5, wherein
   the duration of the period during which the opening degree of the valve element of the regulator reduces from the first predetermined opening degree to the second predetermined opening degree is a duration during which the compressed natural gas is injected into the pressure accumulating portion.

* * * * *